(12) United States Patent
Jeckle

(10) Patent No.: US 7,528,187 B2
(45) Date of Patent: May 5, 2009

(54) ULTRAVIOLET LIGHT ABSORBING COMPOSITION FOR BIRD HUNTING APPARATUS

(76) Inventor: Milan Jeckle, 11001 E. Boone Ave., Spokane, WA (US) 99206

(*) Notice: Subject to any disclaimer, the term of this patent is extended or adjusted under 35 U.S.C. 154(b) by 589 days.

(21) Appl. No.: 11/293,911

(22) Filed: Dec. 5, 2005

(65) Prior Publication Data

US 2006/0117637 A1    Jun. 8, 2006

Related U.S. Application Data

(60) Provisional application No. 60/633,700, filed on Dec. 6, 2004.

(51) Int. Cl.
*C08G 18/28* (2006.01)
*B01F 17/00* (2006.01)
*C08K 5/00* (2006.01)
*C08K 5/07* (2006.01)
*C08K 5/101* (2006.01)
*C08K 5/08* (2006.01)
*C08L 31/00* (2006.01)

(52) U.S. Cl. .............. 524/210; 524/215; 524/236; 524/239; 524/318; 524/356; 524/357; 524/358; 524/386; 524/556

(58) Field of Classification Search .............. 524/210, 524/556

See application file for complete search history.

(56) References Cited

U.S. PATENT DOCUMENTS

2002/0012645 A1 * 1/2002 Midha et al. .............. 424/70.2
2002/0086039 A1 * 7/2002 Lee et al. .................. 424/401

* cited by examiner

*Primary Examiner*—Marc S. Zimmer
*Assistant Examiner*—Nicole M Buie
(74) *Attorney, Agent, or Firm*—Bergman & Jeckle, PLLC

(57) ABSTRACT

A spray-on ultra violet light absorbing composition for application on bird decoys and related bird hunting and bird watching apparatus, and the process for making the composition. The composition is made in three phases each separately mixed and thereafter combined. In phase A, a thickener, optionally a preservative, a pH adjuster and distilled water are combined and mixed. In phase B, a disperser, a solvent, a film forming polymer and a pH buffer are combined and mixed. The mixtures of phase A and phase B are heated, combined and mixed. In phase C, a UV absorbent, a wetting agent, emulsifiers, and optionally a surface smoother, are combined and mixed. The mixture of phase C is heated and added to the heated phase A and phase B mixture. The mixture is thereafter cooled, diluted and homogenized.

2 Claims, 1 Drawing Sheet

ULTRAVIOLET LIGHT ABSORBING COMPOSITION FOR BIRD HUNTING APPARATUS

IIA. RELATED APPLICATIONS

This Application claims the benefit of U.S. Provisional Application No. 60/633,700 filed on Dec. 6, 2004.

II. BACKGROUND OF INVENTION

IIB. Field of Invention

This invention relates generally to apparatus used in bird hunting and bird watching activities, and more particularly to a spray coating for decoys, camouflaged clothing and related apparatus that absorbs and inhibits reflectance of ultraviolet light.

IIC. Background and Description of Prior Art

Color is an interpretation of light waves having a particular wavelength. While it is an organism's eye that receives light waves, it is the organism's brain that interprets those light waves and "sees" colors.

A transparent lens called the cornea is at the front of the eye to allow light waves into the eye. Behind the cornea is the iris, which gives the eye its color. By changing size, the iris regulates the amount of light entering the pupil, which is the orifice defined by the iris. Located behind the iris is a crystalline lens which focuses the light rays entering the eye onto the retina. The retina is the inner most layer of the eye and is covered with photo receptor cells. Light waves enter the eye through the cornea, pass through the pupil are focused by the lens and strike the photo receptors on the retina.

There are two types of photo receptors, rods and cones, which are named for their relative shapes. Rod type photo receptors perceive the intensity of light and enable an organism to see at night. Cone type photo receptors perceive the wavelengths of various light waves and enable the organism to distinguish colors.

Humans are among the minority of mammals that have color vision. In the human eye, rods are found at the peripheral regions of the retina but are nearly absent from the center of the visual field, known as the fovea, where the cones are concentrated. The human eye has about 150,000 cones (color receptors) per square millimeter of fovea area. Humans' eyes have three variants of photo-receptive cones (known as red cones, blue cones and green cones) and for that reason humans are classified as trichromic organisms. Each variant of photo receptive cone carries a unique protein, called an opsin, that reacts when struck by light waves having wavelengths that correspond to the opsin's light sensitivity. It is unknown whether the reaction is physical, chemical or both. The reaction of the opsin is communicated to the brain allowing the organism to distinguish between red, blue and green colors. Thus, the world visually perceived by humans is dominated by light having wave lengths ranging from 400-750 nanometers, or blue to red respectively.

In contrast to humans, birds have tetra-chromic vision. The eyes of tetra-chromic organisms have four variants of photo receptive cones. In addition to having three variants of cones with opsins sensitive to red, green and blue light, birds have a fourth variant of cone with an opsin that is sensitive to ultra violet (UV) light which presumptively enables the organism to perceive ultra violet light that is invisible to humans. The peak sensitivity of the opsin on this fourth variant of photo receptive cone is at about 358 nanometers which is known as Ultra Violet A (UVA) light.

As noted above, while a human eye has about 150,000 cones per square millimeter of fovea area, the eyes of birds have more than one million cones per square millimeter of fovea area. This large difference in the number of cone type photo receptors presumptively provides birds with greater visual acuity than humans, as well as an ability to perceive UV light that is invisible to humans.

Because perceived color is likely dependent upon the number and types of photo receptors in the eye, theoretically birds not only perceive UV colors that are invisible to humans, it is also likely birds perceive the human visible spectrum differently. While the fourth type of photo receptive cone presumptively increases the range of wave lengths birds can perceive, likely creating a quantitative difference in visual ability, the increased dimensionality also likely produces a qualitative change that cannot be translated into human experience. Most likely, "bird colors" are not simply refinements of human hues, but rather it is more likely that "bird colors" are unknown to tri-chromic organisms and thus cannot be described in human terms.

The inability to know what colors and hues are perceived by birds has dramatic implications for the manufacture, construction, design, and use of outdoor sporting apparatus such as decoys, blinds, camouflaged clothing and the like. Items manufactured for use in bird hunting and bird watching activities contain synthetic materials and dyes that may interact with UV light waves differently than similar appearing organic materials. The result may be a decoy, blind or camouflaged clothing that, from the perspective of a human, looks identical to the natural object, but is perceived by a bird to be radically unnatural.

It has been observed that waterfowl and other game birds will unhesitently land in a grouping of decoys during morning and evening twilight, but will avoid the same grouping of decoys during hours of daylight. Coincidentally, UV light is nearly absent during the hours of twilight when the sun's rays are refracted through the earth's atmosphere but are prevalent during the hours of daylight.

It is impractical, if not impossible to precisely duplicate the natural reflectance of UV light off the feathers of birds because the reflectance and color hues are in the UV range that humans cannot perceive. Without being able to perceive the reflectance, any attempt of realistically mimicking the reflection is guesswork. The solution to this problem is to diminish the reflectance of ultraviolet light while maintaining a presumptively natural appearance in the visual spectrum.

The instant invention is a spray on, quick drying, water resistant composition that enhances the effectiveness of decoys, blinds, camouflaged clothing and related apparatus used in bird hunting and bird watching activities. The composition presumptively functions by various methodologies including absorbing UV light waves, converting UV light waves into heat energy and possibly reflecting UV light waves at altered wave lengths not in the UV spectrum although the precise nature of how the composition operates is unknown.

III. SUMMARY OF INVENTION

My invention provides a spray-on, water resistant colloidal composition that absorbs and inhibits reflectance of UV light. The composition is made in three individual phases which are heated and thereafter combined. The composition contains distilled water, Carbopol ETD, Versene 100, Propylene glycol, Dermacryl 79, Triethanolamine, Tegosoft TN2, Parsol® 1789, Tego Care 450, and optionally Dow Corning 200/10 CST and Phenonip.

In providing such a composition, it is:

A principal object to provide a colloidal composition for application on decoys, blinds, camouflaged clothing and related apparatus used in bird hunting and bird watching activities to absorb UV light so that reflected UV light waves are not perceived by birds.

A further object is to provide such a colloidal composition that may be applied with a spray type applicator onto decoys, blinds, camouflaged clothing and related apparatus used in bird hunting and bird watching activities.

A further object is to provide such a colloidal composition that is quick drying and water resistant thereafter.

A further object is to provide such a colloidal composition that prevents or diminishes reflectance of UV light waves.

A further object is to provide a stable colloidal composition which maintains a layer of UV absorbing material within the water based carrier medium of the composition.

A further object is to provide such a colloidal composition which when applied to apparatus used in bird hunting and bird watching activities causes the apparatus to be perceived by a bird as natural.

A still further object is to provide such a colloidal composition that is new and novel, of durable and stable nature, of simple and economic manufacture and that is otherwise well suited for the uses and purposes for which it is intended.

Other and further objects of my invention will appear from the following specification and accompanying drawings which form a part hereof. In carrying out the objects of my invention it is to be understood that its features are susceptible to change in design, order and arrangement with only one preferred and practical embodiment of the best known mode being illustrated in the accompanying drawings and specified as is required.

IV. BRIEF DESCRIPTIONS OF THE DRAWINGS

V. DESCRIPTION OF PREFERRED EMBODIMENT

Figure 1:
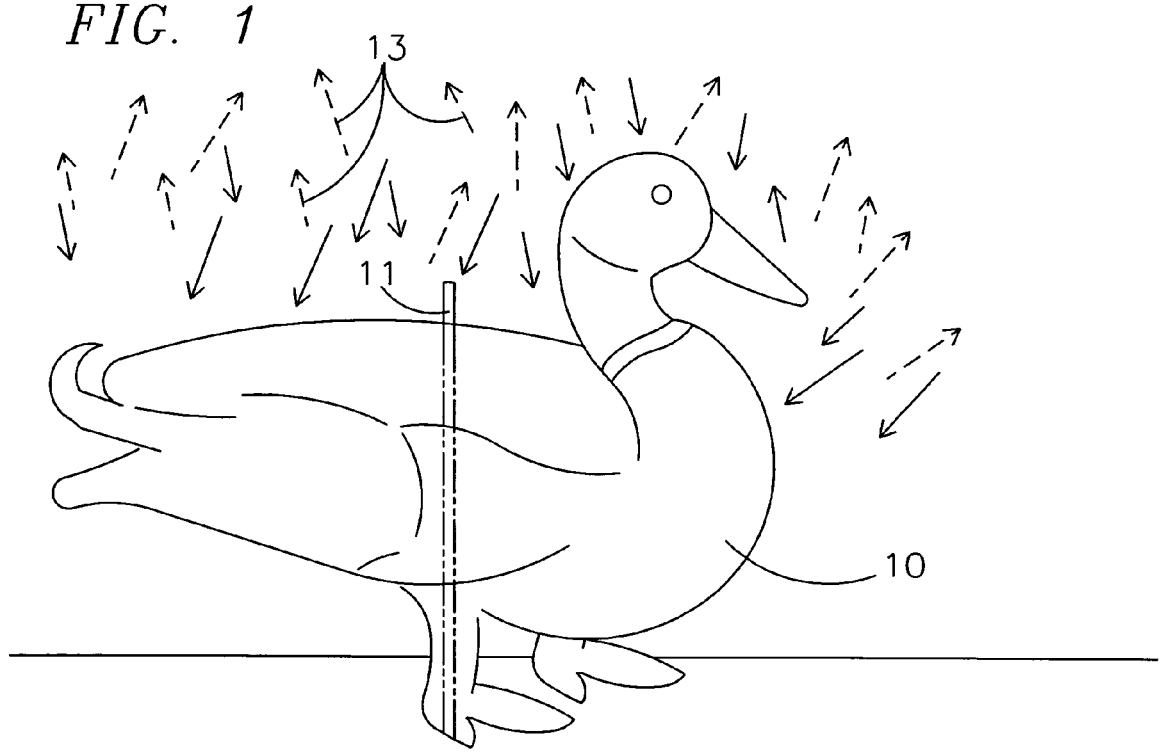
FIG. 1 is a graphic illustration of ultraviolet light waves striking and reflecting off a standard field type duck decoy.

The chemical ingredients used in the preferred embodiment of the composition are identified by chemical name and common trade name in Table 1. The International Nomenclature for Cosmetic Ingredients (INCI) chemical names have been provided. Other chemicals having the same properties but produced by other manufacturers and having different trade names may be equally suitable for manufacture of the composition.

The instant invention provides a stable spray-on water resistant ultraviolet (UV) light absorbing composition in its preferred embodiment having the following ingredients:

TABLE 1

| Ingredient: Manufacturer: Address: | INCI Designation: | Purpose: |
| --- | --- | --- |
| Carbopol ETD Noveon, Inc. Cleveland, OH | Acrylates/$C_{10\text{-}30}$ Alkyl Acrylate Crosspolymer | thickener |
| Versene 100 | Tetrasodium EDTA | pH adjuster, |

TABLE 1-continued

| Ingredient: Manufacturer: Address: | INCI Designation: | Purpose: |
| --- | --- | --- |
| Dow Chemical Co. Midland, MI | (Ethylenediamine Tetraacetic Acid) | chelating agent |
| Phenonip Clariant UK, Ltd. Leeds, UK | Phenoxyethanol | preservative |
| Propylene Glycol Spectrum Chemical Mfg. Gardena, CA | 1,2-propanediol | solvent, cross-linking agent |
| Dermacryl 79 National Starch & Chemical Co. Bridgewater, NJ | Acrylates/Octyl-acrylamide Copolymer | film forming polymer |
| Triethanolamine National Starch & Chemical Co. Bridgewater, NJ | Triethanolamine 99% | pH buffer, emulsifier, chelating agent |
| TegoSoft TN2 Goldschmidt Chemical Co. Hopewell, VA | $C_{12\text{-}15}$ Alkyl Benzoate | wetting agent, emulsifier |
| Parsol ® 1789 DSM Nutritional Products, Inc. Parsippany, New Jersey | Butyl Methoxydi-benzoylmethane | UV light absorber |
| Titanium dioxide Spectrum Chemical Mfg. Gardena, CA | Titanium dioxide | UV light reflectant |
| Tego Care 450 Goldschmidt Chemical Corp. Hopewell, VA | Poly Glyceryl-3 Methyl glucose Distearate | emulsifier |
| Dow Corning 200/10 CST Dow Chemical Co. Midland, MI | Dimethicone | surface smoother |
| Distilled Water | water | carrier medium |

The described process of manufacture forms a stable liquid colloidal composition that may be applied with a spray applicator or otherwise, and when dry forms a layered water resistant matrix having UV light absorbing material therein.

The UV light absorbing material of the instant invention is oil based and hydrophobic by nature. Forming of a stable colloidal composition with hydrophobic material requires that the material be stabilized so it does not separate from the water carrier medium. Tego Care 450 and Tegosoft TN2 are elongate molecules having one end portion that is hydrophilic and an opposing end portion that is hydrophobic. These elongate molecules stabilize the composition by interaction of the hydrophobic end portion with the oil based UV absorbing material and the hydrophilic end portion with the water molecules of the carrier medium. The result is a stable colloidal composition with a water carrier medium holding the oil based UV absorbing material in suspension.

The inclusion of Phenonip, which is a preservative, and Dow Corning 200/10 CST, which is a surface smoother, in the composition is not essential to operability but is preferable to provide longer shelf-life and give the composition more appealing texture when applied to clothing and exposed skin.

The composition is made in three phases to maintain the proper pH balance for each phase and to ensure that the intermediate chemical reactions occur as desired. Manufacture in three separate phases also prevents undesirable premature reactions between ingredients of the separate phases with each other.

Phase A. 619.10 milliliters of distilled water is added to a 5 liter beaker. A magnetic stir bar is placed in the beaker containing the water and operated to create a vortex in the water. 1.80 grams of Carbopol ETD, which is a thickener, is slowly added to the beaker containing the distilled water and mixed for approximately 15 minutes while maintaining a vortex in the mixture throughout the mixing. Following the mixing, the Carbopol ETD should be evenly dispersed and all "fish-eyes" should have disappeared. 1.50 grams of Versene 100, which is a pH adjuster and chelating agent, is slowly added to the mixture of distilled water and Carbopol ETD and mixed with the magnetic stir bar at a moderate speed of approximately 5 revolutions per second. 0.70 grams of Phenonip, which is a preservative, optionally is added to the mixture in the beaker to prevent bacterial or fungal growth in the composition. Phase A is mixed as described because the pH of the mixture is material. Versene 100 is a weak base and pH adjuster and also a chelating agent. When combined with water, the Versene 100 increases the pH of the mixture so that the Carbopol ETD is more completely drawn into colloidal suspension. Without inclusion of Versene 100, the Carbopol ETD has less colloidal suspension. The Phase A mixture is set aside.

Phase B. 40.50 grams of Propylene Glycol, which is a solvent and cross-linking agent, is placed in a 2 liter beaker. 20.01 grams of Dermacryl 79, which is a water resistant film forming polymer, is added to the beaker containing the Propylene Glycol and mixed by hand with a glass stir rod until all "fish-eyes" have disappeared. The result is a thick white oily paste. 7.18 grams of Triethanolamine, which is a pH buffer, emulsifier and chelating agent, is added to the mixture of Propylene Glycol and Dermacryl 79 and mixing is continued with the glass stir rod until the mixture appears to be a uniform thick white oily paste. The Dermacryl 79 combines with the Triethanolamine to create a reaction product which is soluble in water. The Propylene Glycol is an additional solvent that ensures that the Dermacryl 79 dissolves into the mixture completely.

Combining Phase A and Phase B. The mixture made in Phase B is transferred into the 5 liter beaker containing the mixture made in Phase A. A stir bar is used to mix the Phase A and Phase B mixtures while heating the combined mixtures to 80° C. At first, the mixture of Phase B forms a separate layer on the surface of the Phase A mixture, but as the mixing and heating is continued the two mixtures thin and combine to form a homogeneous white mixture. The combined Phase A and Phase B mixture is maintained at 80° C.

Phase C. 165.00 milliliters of distilled water, which is a carrier medium, is added to a 2 liter beaker and stirred with a magnetic stir bar at a moderate speed of approximately 5 revolutions per second. 60.23 grams of Tegosoft TN2, which is an emulsifier and wetting agent, is added to the beaker containing the distilled water. The Tegosoft TN2 does not mix with the distilled water, but instead forms a separate layer on the surface of the distilled water. 16.03 grams of Parsol® 1789, which is a UV light absorber, is added to the beaker containing the distilled water and the Tegosoft TN2. The Parsol® 1789 does not immediately mixed with either the Tegosoft TN2 or the distilled water, but after approximately 15 minutes of mechanical mixing using the magnetic stir bar at moderate speed, a homogenous colloidal suspension is formed by the Parsol® 1789 and the Tegosoft TN2 which remains as a separate layer on top of the distilled water in the beaker. 30.07 grams of Tego Care 450, which is an emulsifier, is added to the beaker containing the foregoing Phase C mixture. The particles of Tego Care 450 do not combine with any of the other ingredients in the beaker, but instead fall to the bottom of the beaker. Because a magnetic stir bar is unable to stir the mixture by itself, a glass stir rod is used in combination with the magnetic stir bar. The combined methods of mixing cause a large portion of the Tego Care 450 particles to break up forming a suspension in the mixture. 30.03 grams of Dow Corning 200/10 CST, which is a surface smoother and lubricant for spray nozzles, is added to the beaker containing the Phase C mixture while the magnetic stir bar and glass stir rod mixing is continued and the mixture is heated to 80° C. As the mixing and heating continue, the ingredients combine to form a homogenous liquid mixture having a light yellow color that thickens as it is heated. The Tegosoft TN2 and the Tego Care 450 molecules bind to the Parsol® 1789 molecules and to the water molecules stabilizing the colloidal suspension of the oil based Parsole® 1789 in the water carrier medium.

Combining Phase C with the Phase A and Phase B combination. After being heated to 80° C., the Phase C mixture is added to the 5 liter beaker containing the combination of Phase A and Phase B mixtures already at 80° C. The newly combined mixture is held at 80° C. for approximately 15 minutes while mixing with a magnetic stir bar continues until a thick white homogenous mixture forms in the beaker.

The mixture is allowed to cool to approximately 35° C. and is then diluted with distilled water at a volume ratio of four parts distilled water to one part mixture. Thereafter, the diluted colloidal mixture is mechanically homogenized at approximately 25,000 rpm for a period of approximately five minutes.

Testing of the ultraviolet light reflectance of this composition showed the following:

EXAMPLE 1

A translucent layer of the UV light absorbing composition was applied to a glass test slide with a spray bottle. A translucent layer is visible without magnification and has a slightly milky appearance but is not opaque. An uncoated glass control slide provided a comparison measurement for transmittance. Ultraviolet light transmittance was measured for the test slide and the control slide for UV light having wave lengths between 300-400 nanometers. The measurements showed a translucent layer of composition on the test slide, prevented passage of approximately 65% of the incident UV light waves in the 340-370 nanometer range, while the control slide lessened passage of less than 1% of incident UV light waves in the same wavelength range.

EXAMPLE 2

A translucent layer of the UV light absorbing composition was applied to a glass test slide with a spray bottle and the test slide was thereafter stored in an unlighted and unventilated cabinet for a period of 14 days. Following the 14 days of storage, UV light transmittance was measured for the test slide as well as for an uncoated control slide for UV light having wave lengths between 300-400 nanometers. The measurements showed the test slide prevented passage of approximately 33% of incident UV light in the 340-370 nanometer range, while the control slide lessened passage of less than 1% of incident UV light waves in the same wavelength range.

EXAMPLE 3

The test slide from Example 2 that had been stored for 14 days was immersed in tap water for a period of 45 minutes. Following the period of emersion, UV light transmittance was measured for the test slide as well as for an uncoated control slide for UV light having wave lengths between 300-400 nanometers. The measurements showed the test slide prevented passage of approximately 29% of the transmitted UV light in the 340-370 nanometer range, while the control slide lessened passage of less than 1% of incident UV light waves in the same wavelength range.

Having described the structure and composition of my UV light absorbing colloidal composition its use and operation may be understood.

In the preferred method of application, a bird decoy 10 is set out on a suitable work surface and is coated with the instant composition, preferably using a spray type applicator of known construction, or a saturated cloth, such that the exterior surfaces of the decoy 10 are coated. The composition is allowed to air dry after application, which takes approximately 1-5 minutes depending upon temperature and humidity conditions. Thereafter the decoy 10 is used in a customary fashion. If desired, the composition may also be sprayed onto exposed skin, such as the face and hands during hunting and bird watching activities.

Use of the ultraviolet light absorbing coating composition on a decoy 10 is shown in FIG. 1, wherein there is seen a decoy 10, a field type decoy having feet rather than a keel in this in this illustration, secured to the ground with elongate vertical spike 11 extending therethrough. UV light rays 13 striking and reflected from the decoy 10 are indicated by the arrows thereon.

Figure 2:
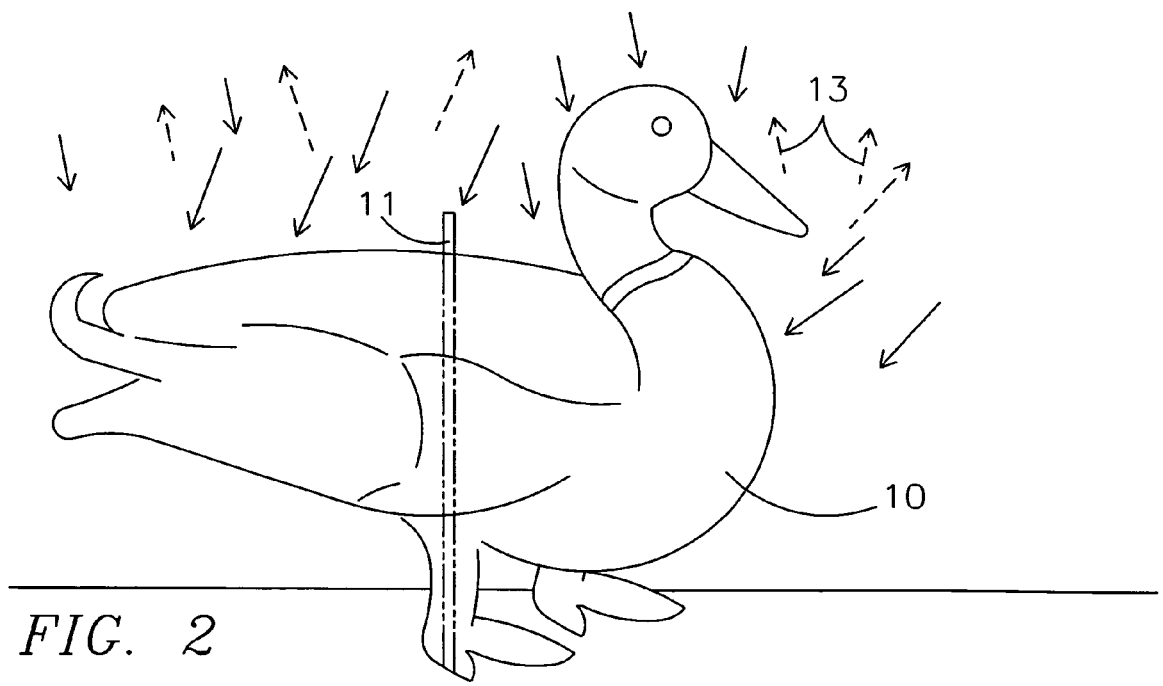
FIG. 2 is a graphic illustration of the duck decoy of FIG. 1 having a coating of the ultraviolet light absorbing composition illustrating the reduced number of ultraviolet light waves reflecting off the treated decoy.

The illustration of FIG. 2 shows the decoy 10 of FIG. 1 that has been coated with the instant UV absorbing coating composition. Here, as illustrated by the reduced number of light rays 13 with exiting arrows, the quantity of UV light waves 13 reflected from the decoy 10 is reduced so that the UV light reflection from the decoy 10 is less perceptible by birds.

Although the composition is stable and water resistant, it may be necessary to reapply the composition to decoys and related apparatus after a period of use or after extended exposure to water and atmospheric elements.

The following are examples showing results of use of the instant ultraviolet light absorbing composition in actual bird hunting situations:

EXAMPLE 4

Two people turkey hunting in the Colville National Forest in the State of Washington during the spring turkey season used the instant UV light absorbing composition to coat two hen turkey decoys and a hunting blind. The hunters set up the hen decoys and the blind well prior to daylight in a clearing frequented by large groups of turkeys and mature "strutting" Tom turkeys in particular. The blind was set up adjacent a tree line at the base of a conifer tree. During the early morning hours, when turkeys are typically most active, no turkeys were seen and no turkeys entered the clearing or approached the decoys. At about 9:30 a.m. the two hunters became aware that a second group of turkey hunters was nearby and had set out their own turkey decoys and their own blind about 50 feet away. The second group of hunters was positioned so they could not be seen by the first hunters in their blind. After the second group of turkey hunters recognized their presence was known, and unwanted, they picked up their turkey decoys, disassembled their blind and departed. Before the departing hunters had reached the opposite side of the clearing, about 300 yards away, two mature Tom turkeys flew directly over the first hunter's blind, landed within 10 feet of the hen decoys that had been coated with the instant composition, and immediately began to strut. The first two hunters "bagged" the two mature Tom turkeys which weighed 24 and 27 pounds respectively.

EXAMPLE 5

An experienced and avid waterfowl hunter, hunting near Sacramento, Calif., set out two similar sized groupings of similar waterfowl decoys. The decoys of one grouping had been coated with the instant UV light absorbing composition and the decoys of the second grouping were left uncoated. The hunter also coated his camouflaged clothing and the camouflage material of his blind with the instant composition. Throughout the day, various species of waterfowl including ducks and geese "locked up and side-slipped" to land amongst the treated decoys, but continually flared away from the untreated decoys, especially during hours of full daylight. Other species of birds, including cranes, raptors and blue heron flew directly over the hunter without reacting or shying away. A red-tailed hawk flew within "arm's-reach" and a peregrine falcon landed on the hunter's blind.

Successful hunting results make it appear that the composition may be doing more than merely absorbing and inhibiting reflectance of UV light waves. However the nature of how something more than absorbance and inhibiting reflectance might be occurring is unknown.

The foregoing description of my invention is necessarily of a detailed nature so that a specific embodiment may be set forth as is required, but it is to be understood that various modifications of detail, rearrangement and multiplication of parts might be resorted to without departing from the spirit, essence or scope of invention.

Having thusly described my invention, what I desire to protect by Letters Patent, and what I claim is:

1. An ultra violet light absorbent coating composition for enhancing the effectiveness of decoys, blinds, camouflage and related apparatus used in the hunting and watching of birds, comprising:

a viscously fluidic water based polymeric coating composition that in its fluidic state wets the surface of decoys, blinds, camouflage and related apparatus used in the hunting and watching of birds sufficiently to adhere thereto and dries to a dried state after placement to form a relatively thin somewhat resilient cohesive and uniform coating absorbent of ultra violet light, said coating composition containing by weight having from 0.8% to 8.0% of butyl methoxydibenzoylmethane a thickener $C_{10-30}$ alkyl acrylate crosspolymer from 0.04% to 0.40%; a pH adjuster and chelating agent tetrasodium ethylene-diamine tetracetic acid from 0.07% to 0.60%; a solvent and cross-linking agent 1,2-propanediol from 2.0% to 16.0%; a film forming polymer octylacrylamide co-polymer from 1.0% to 4.0%; a pH buffer, emulsifier and chelating agent, triethanolamine 99% from 0.35% to 3.5%; a wetting agent and emulsifier, $C_{12-15}$ benzoate from 3.0% to 12.1%; an emulsifier poly glyceryl-3 methyl glucose distearate from 1.5% to 6.1%; and distilled water from 91.24% to 49.3% suspended in the coating composition in its fluidic state;

a thickener C 10-30 alkyl acrylate crosspolymer from 0.04% to 0.40%;

a pH adjuster and chelating agent tetrasodium ethylene-diamine tetraacetic acid from 0.07% to 0.60%;

a solvent and cross-linking agent 1,2 propanediol from 2.0% to 16.0%;

a film forming polymer octylacrylamide co-polymer from 1.0% to 4.0%;

a pH buffer, emulsifier and chelating agent, triethanolamine 99% from 0.35% to 3.5%:

a wetting agent and emulsifier, C12-15 alkyl benzoate from 3.0% to 12.1%;

an emulsifier poly glyceryl-3 methyl glucose distearate from 1.5% to 6.1%; and distilled water from 91.24% to 49.3%; and said coating composition being somewhat insoluble in and impermeable by water in its dried state.

2. The method of compounding the coating composition of claim 1 comprising:

forming a phase A mixture containing a thickener $C_{10-30}$ alkyl acrylate crosspolymer in the amount of 0.04% to 0.40% by weight of the final composition, a pH adjuster and chelating agent tetrasodium ethylenediamine tetraacetic acid in the amount of 0.07% to 0.60% by weight of the final composition, and a carrier medium distilled water in the amount of 49.3% to 91.24% by weight of the final composition;

forming a phase B mixture containing, a solvent and cross-linking agent 1,2-propanediol in the amount of 2.0% to 16.0% by weight of the final composition, a pH buffer, emulsifier and chelating agent triethanolamine 99% in the amount of 0.35% to 3.50% by weight of the final composition, and a film forming polymer octylacrylamide copolymer in the amount of 1.0% to 4.0% by weight of the final composition; and forming a phase C mixture containing, the ultra violet light absorbent butyl methoxydibenzoylmethane in the amount of 0.8% to 8.0% by weight of the final composition, a wetting agent and emulsifier $C_{12-15}$ alkyl benzoate in the amount of 3.0% to 12.1% by weight of the final composition, and an emulsifier poly glyceryl-3 methyl glucose distearate in the amount of 1.5% to 6.1% by weight of the final composition; and heating the phase A mixture to 80° C., heating the phase B mixture to 80° C. and combining and mixing the heated phase A mixture and the heated phase B mixture;

heating the phase C mixture to 80° C. and combining and mixing the heated phase C mixture with the heated, combined and mixed phase A and phase B mixtures;

cooling the combined phase A, phase B and phase C mixtures to 35° C. and diluting the cooled combined mixtures with distilled water in a ratio of one part by volume of final combined mixtures to four parts by volume of water to form the final composition; and mechanically homogenizing the final composition.

* * * * *